US012607611B2

(12) United States Patent
Rowe

(10) Patent No.: US 12,607,611 B2
(45) Date of Patent: Apr. 21, 2026

(54) CHEMICAL SPECIES BASED SELECTIVE DILUTION FOR ANALYSIS OF A SUB-FORMATION SAMPLE

(71) Applicant: Halliburton Energy Services, Inc., Houston, TX (US)

(72) Inventor: Mathew Dennis Rowe, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 388 days.

(21) Appl. No.: 18/492,290

(22) Filed: Oct. 23, 2023

(65) Prior Publication Data

US 2024/0393300 A1      Nov. 28, 2024

Related U.S. Application Data

(60) Provisional application No. 63/504,369, filed on May 25, 2023.

(51) Int. Cl.
*G01N 30/72* (2006.01)
*G01N 30/02* (2006.01)
(Continued)

(52) U.S. Cl.
CPC ......... *G01N 30/7206* (2013.01); *G01N 30/32* (2013.01); *G01N 30/88* (2013.01); *G01N 2030/025* (2013.01)

(58) Field of Classification Search
CPC ....... G01N 2030/025; G01N 2030/201; G01N 2030/202; G01N 2030/207; G01N 30/06;
(Continued)

(56) References Cited

U.S. PATENT DOCUMENTS 10,408,747 B2    9/2019    Schlueter et al.
11,307,182 B2    4/2022    Leigh et al.
(Continued)

FOREIGN PATENT DOCUMENTS

KR        20210119583        10/2021

OTHER PUBLICATIONS

"PCT Application No. PCT/US2023/077690, International Search Report and Written Opinion", Feb. 20, 2024, 13 pages.

*Primary Examiner* — Kristina M Deherrera
*Assistant Examiner* — Gedeon M Kidanu
(74) *Attorney, Agent, or Firm* — DeLizio, Peacock, Lewin and Guerra, LLP

(57) ABSTRACT

Embodiments of a gas chromatography system and method are disclosed. The method includes injecting a gas sample into a first gas separation device that includes at least one first hydrocarbon identified for analysis; determining that a concentration level of the first hydrocarbon needs to be reduced; diluting the gas sample with a first amount of a dilutant from a first dilutant mass controller; separating out a subset of chemical species from the first diluted gas sample; injecting the gas sample into a second gas separation device, the sample including at least one second hydrocarbon identified for analysis; determining that a concentration level of the second hydrocarbon needs to be reduced; diluting the gas sample with a second amount of the dilutant from a second dilutant mass flow controller; separating out a subset of chemical species from the second diluted gas sample; analyzing the subsets of the diluted samples.

20 Claims, 11 Drawing Sheets

(51) Int. Cl.
  *G01N 30/32* (2006.01)
  *G01N 30/88* (2006.01)
(58) Field of Classification Search
  CPC ........ G01N 30/16; G01N 30/24; G01N 30/32;
      G01N 30/72; G01N 30/7206; G01N
                30/88
  See application file for complete search history.

(56) References Cited

U.S. PATENT DOCUMENTS

| | | |
|---|---|---|
| 2018/0059089 A1 | 3/2018 | Hinton et al. |
| 2019/0072464 A1* | 3/2019 | Wiederin ............... G01N 30/06 |
| 2020/0256188 A1* | 8/2020 | Rowe ..................... E21B 21/01 |

* cited by examiner

1100

CHEMICAL SPECIES BASED SELECTIVE DILUTION FOR ANALYSIS OF A SUB-FORMATION SAMPLE

CLAIM OF PRIORITY

This Application claims priority to U.S. Provisional Application No. 63/504,369 filed on May 25, 2023.

BACKGROUND

As part of hydrocarbon recovery from subsurface formations, evaluation of the hydrocarbon reservoirs from such formations is performed to maximize recovery and minimize costs. Formation evaluation can generally include collection of formation fluid samples for analysis of their hydrocarbon content.

BRIEF DESCRIPTION OF THE DRAWINGS

Embodiments of the disclosure may be better understood by referencing the accompanying drawings.

DESCRIPTION

Figure 1:
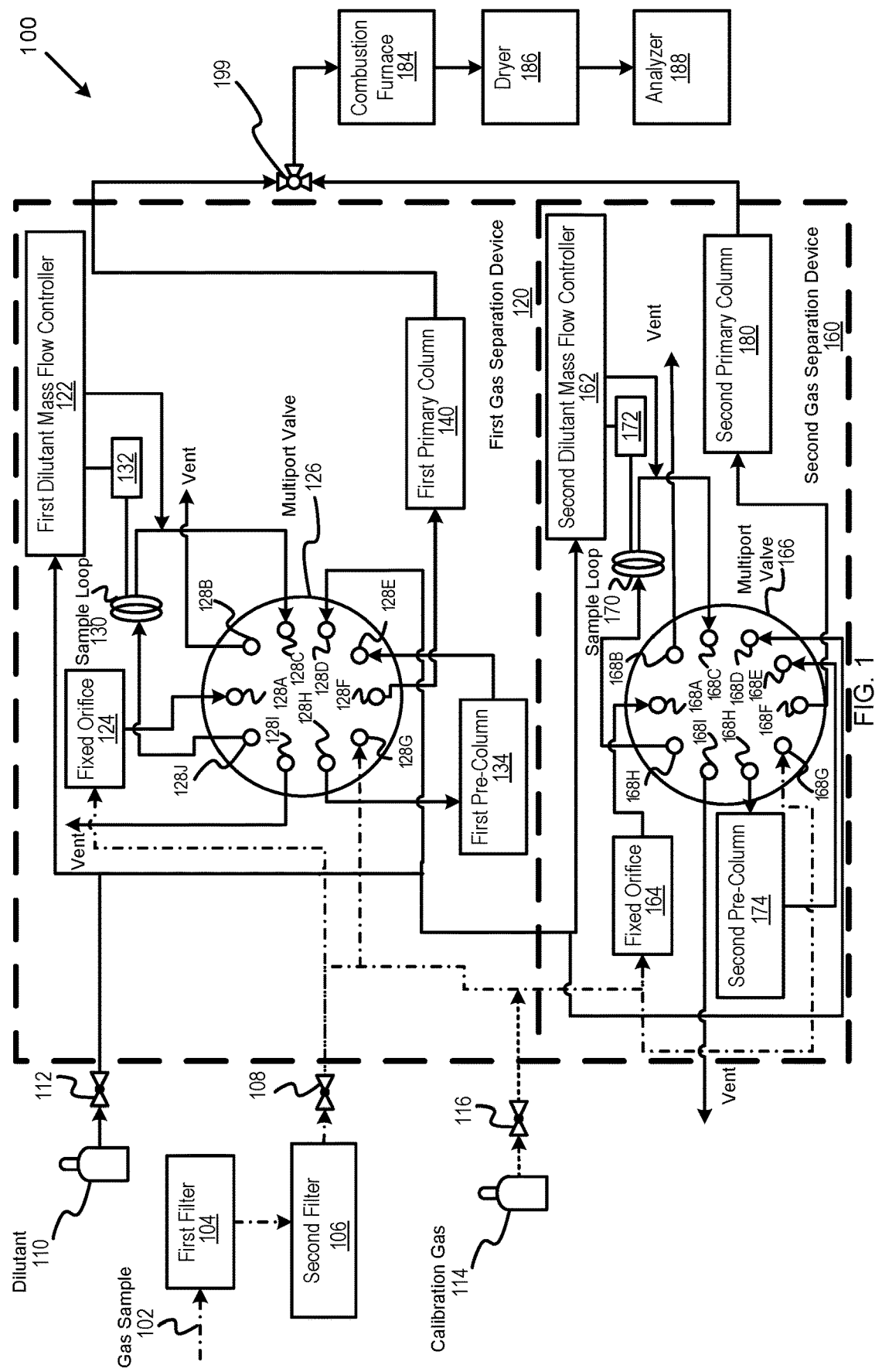
FIG. 1 depicts a first example of a gas chromatography system that provides at least one separate dilutant instrument for each of multiple gas separation devices, according to some embodiments.

The description that follows includes example systems, methods, techniques, and program flows that embody aspects of the disclosure. However, it is understood that this disclosure may be practiced without these specific details. For instance, this disclosure refers to analysis of active formation samples from a wellbore during drilling in illustrative examples. Aspects of this disclosure can also be applied to formation samples during other stages of wellbore operations. For example, aspects of this disclosure may also be applied to analysis of formation samples during post drilling operations (such as a production operation). In other instances, well-known instruction instances, protocols, structures, and techniques have not been shown in detail in order not to obfuscate the description.

Example embodiments may include analysis of formation samples that include gas chromatography. For example, example embodiments may be used as part of a formation evaluation of a subsurface formation from which the formation sample originates. Such embodiments may be used to detect and analyze hydrocarbons in formation samples. Example implementations may include gas chromatography to separate isomers as part of the hydrocarbon analysis in formation samples. In some implementations, Isotope Ratio Mass Spectrometry (IRMS) may be used as part of this hydrocarbon analysis.

In some embodiments a gas chromatography (GC) may include a primary column and detector and one or more secondary columns and detectors. The columns may be of varied designs and materials. The detectors may be any type of instrument to measure analytes in a gas. Examples of such detectors may be Flame Ionization Detector (FID), Photoionization Detector (PID), Thermal Conductivity Detector (TCD), Mass Spectrometry (MS) detector, or another types. A control system may be included that can receive external inputs for controlling activation of one or more secondary columns and detectors in the GC instrument.

In some embodiments, as part of the analysis, the formation sample may be diluted in order to have a chemical compound concentration in a specified range. When using a bulk dilution of a formation sample with alkanes based on methane to meet the need of having methane concentration in a specified range, other alkanes may drop out of the detection window. For example, when using a bulk dilution of the formation sample with alkanes based on methane to meet the need to have methane concentration in a specified range, other alkanes such as ethane and propane may drop out of the detection window. Example implementations may include selective dilution based on the chemical species being detected. For example, a selective dilution may be based on a specific carbon umber to dilute or not dilute into the detection window (as part of the formation analysis).

In some implementations, this selective dilution may occur prior to separation of the formation sample using a gas chromatography instrument. Alternatively or in addition, this selective dilution may occur after separation of the formation sample using a gas chromatography instrument. Accordingly, example embodiments may allow for independent individual dilution of chemical species as part of the formation sample analysis. Some embodiments may include a gas chromatograph-combustion-isotropic ratio mass spectrometer (GC-C-IRMS) for formation sample analysis.

In some implementations, a GC-C-IRMS may require that the concentration of a chemical species be in a defined concentration range in order to quantify. For example, a formation sample may have hydrogen sulfide ($H_2S$) and alkenes. The GC-C-IRMS may remove the $H_2S$ and alkenes from the sample stream through the use of copper and potassium permanganate, respectively. In the GC-C-IRMS, the sample may then pass through a fixed orifice, a proportional valve, mass flow controller, etc. to a multiport valve. The sample may then be loaded into a sample loop that may include an input for a dilutant, such as Helium (He), with individual gas chromatography instruments for a specific and limited alkene separation. For example, the sample may be diluted with He based on previous results from other GC instruments, IR detectors etc.

The sample may then be separated into components. The sample may also be passed through a furnace with catalysts to thermal degrade alkanes into carbon dioxide. The sample may then be dried using one or more of a number of techniques (such as Nafion, cooler, etc.) to remove water. The sample may then be passed through an IRMS to perform analysis of the sample from the formation.

In some embodiments a gas chromatography (GC) instrument may include a primary column and detector and one or more secondary columns and detectors. The columns may be of varied designs and materials. The detectors may be any type of instrument to measure analytes in a gas. Examples of such detectors may be Flame Ionization Detector (FID), Photoionization Detector (PID), Thermal Conductivity Detector (TCD), Mass Spectrometry (MS) detector, or another types. A control system may be included that can receive external inputs for controlling activation of one or more secondary columns and detectors in the GC instrument.

In some embodiments, a control device may be coupled to the gas chromatography instrument for controlling the gas chromatography instrument. For example, the control device may control the opening and closing of the valve to enable use of the one or more secondary columns and detectors. Additionally, the control device may be configured to receive one or more external inputs for controlling the gas chromatography instrument.

Example embodiments overcome limits of gas separation devices that are unable to individually dilute the chemical samples processed therein.

Examples of Gas Chromatography Systems with Selective Dilution

Different example implementations of a gas chromatography and gas separation systems with selective dilution are now described with reference to FIGS. 1-6.

FIG. 1 depicts a first example of gas chromatography system 100, according to some embodiments. In this example, a gas sample 102 is provided for processing by the gas chromatography system 100 having at least a first gas separation device 120 and a second gas separation device 160. The gas sample 102 may be an active sample taken during a drilling or downhole process and may include fluid from the formation mixed in with drilling or processing fluid. The gas sample 102 may have a number of chemical compounds comprising a number of hydrocarbons. At least one of at least one first and one second hydrocarbon may be identified for analysis by the gas chromatography system 100.

In some examples, the gas sample 102 may pass through a first filter 104, such as an H$_2$S filter, to remove alkenes. In some examples, the first filter may use copper and potassium permanganate to remove the alkenes. Alkenes can cause problems with the GC instruments and therefore are beneficial to filter from the gas sample. The gas sample 102 may pass through a second filter 106, such as an unsaturated hydrocarbons filter. The gas sample 102 is now a filtered sample. The filtered gas sample 102 may then pass through a first input valve 108 and may then be split into one or more individual gas separation devices such as the first gas separation device 120 and the second gas separation device 160 according to one or more hydrocarbons identified for analysis. A calibration gas 114 may also pass through a calibration valve 116. In some embodiments, the calibration gas 114 may be a carrier gas, and in some examples may be combined with the filtered gas sample before passing into the first and second gas separation devices 120 and 160.

Each of the hydrocarbons identified in the gas sample 102 for analysis may each have an identified concentration level or range for quantification. If the concentration level needs to be adjusted, a dilutant 110 may need to be added. Previous gas separation and chromatography systems have generally introduced dilutant directly before a gas chromatography column or on specific sample circuits after gas chromatography analysis. However, each hydrocarbon and chemical species needing to be analyzed from a formation sample may have different concentration levels and may need to be diluted individually. A dilutant valve 112 directs the dilutant 110 to the first and second gas separation devices 120 and 160 individually via an individual dilutant mass flow controller coupled with each device. The first gas separation device 120 includes a first dilutant mass flow controller 122. The second gas separation device 160 includes a second dilutant mass flow controller 162.

The filtered gas sample 102 is injected into the first gas separation device 120 in this example through a first fixed orifice 124 and passes into a first multiport valve 126. The first multiport valve 126 may include a plurality of ports 128A through 128J, wherein each port is a one-way entry or exit port. The port 128A receives the gas sample 102 from the first fixed orifice 124. The port 128J may direct the sample to pass through a first sample loop 130. The sample loop 130 may include one or more individual gas chromatography instruments for a specific and limited alkene separation. The sample loop 130 is coupled with a sample analysis processor 132, which determines the concentration range and determines whether or not dilution of the gas sample 102 is needed in order for the concentration of the gas sample 102 to be within an analyzable range. The sample analysis processor 132 may determine the concentration level based on an isotopic ratio (IR), a tunable diode laser (TDL) analyzer, or other non-destructive detectors used in gas sample analysis, or in some embodiments, from previous test results. If dilution is needed, a first amount of dilutant 110 from the first dilutant mass flow controller 122 is mixed with the gas sample 102 and passes back into the multiport valve 126 through the port 128C. The diluted sample passes through the port 128H to a first pre-column 134 for processing of the diluted sample. The first pre-column 134, in some embodiments, may remove a portion of the gas sample and pass along analyte components for further processing through the port 128E. In some applications, the pre-column 134 may direct the analytes to a first primary column 140 from the port 128F. The pre-column 134 may also backflush part of the sample through the port 128D. The analyzed sample from first pre-column 134 passes back into the multiport valve 126 through port 128E. The first primary column 140 separates the analytes or isomers of interest and returns the sample back to the multi-port valve 126. The ports 128B and 128I allow for venting of the sample and/or one of more of the gases therefrom. The port 128G may connect with calibration valve 116 for receiving receive a carrier or calibration gas. The gas sample 102 may pass through several iterations of the sample loop 130, dilution, pre-column 134 and primary column 140 before exiting the first separation device 120 for further gas chromatography processing.

The second gas separation device 160 is configured similar to the first gas separation device 120. The filtered gas sample 102 enters the second gas separation device 160 in this example through a second fixed orifice 164 and passes into a second multiport valve 166. The second multiport valve 166 may include a plurality of ports 168A through 168J, wherein each port is a one-way entry or exit port. The port 168A receives the gas sample 102 from the second fixed orifice 164. The port 168J may direct the sample to pass through a second sample loop 170. A sample analysis processor 172 may be communicatively coupled with the sample loop 170. The sample analysis processor 172 may determine a concentration range of the gas sample 102 and determine whether or not dilution of the gas sample 102 is needed.

In response to the sample analysis processor 172 determining that dilution may be needed to increase a concentration of the at least one hydrocarbon, the second dilutant mass flow controller 162 may direct a second amount of dilutant 110 to be mixed with the gas sample 102 after the sample loop 170 and passes back into the multiport valve 166 through the port 168C. The port 168H is coupled with a second pre-column 174 for processing analytes from the diluted sample, and as needed, backflush through the port 168D. The diluted sample passes back into the multiport valve 166 through port 168E from second pre-column 174, and may then be directed to a second primary column 180 for separating analytes or isomers of interest from the diluted sample. The gas sample 102 may pass through several iterations of the sample loop 170, dilution, the second pre-column 174, and second primary column 180 before exiting second gas separation device 160 for further processing. The ports 168B and 168I allow for venting of the sample and/or one of more of the gases therefrom. The port 168G may connect with calibration valve 116 for receiving receive a carrier or calibration gas.

In some examples, the processed and analyzed gases may be sent for further gas chromatography processing. The processed gas samples 102 may pass through a valve 199 and on to combustion furnace 184, dryer 186, and gas chromatography analyzer 188. In the combustion furnace 184, catalysts may be added to thermally degrade alkanes that may be in the sample to carbon dioxide. The dryer 186 may dry the sample through Nafion, cooler, or other means to remove water or moisture from the sample. The analyzer 188 may, in some examples, be an isotropic ratio mass spectrometer (IRMS), and in some embodiments, include a sample injector, a control device, and at least a primary columns and detector. Some systems may also include a secondary column and detector. The analyzer 188 analyzes the subset of the chemical species to measure an isotopic composition of the at least one first hydrocarbon and an isotopic composition of the at least second hydrocarbon.

In some embodiments, a controller may be coupled with the gas chromatography system 100. The controller may be configured to communicate with a device positioned downhole in the wellbore. The device may perform or adjust a downhole operation in a wellbore based on analysis of at least one of the hydrocarbons from the gas sample 102. For example, a drilling speed or direction may be adjusted, a drilling path or target may be adjusted, and various other operation adjustments may be made.

Figure 2:
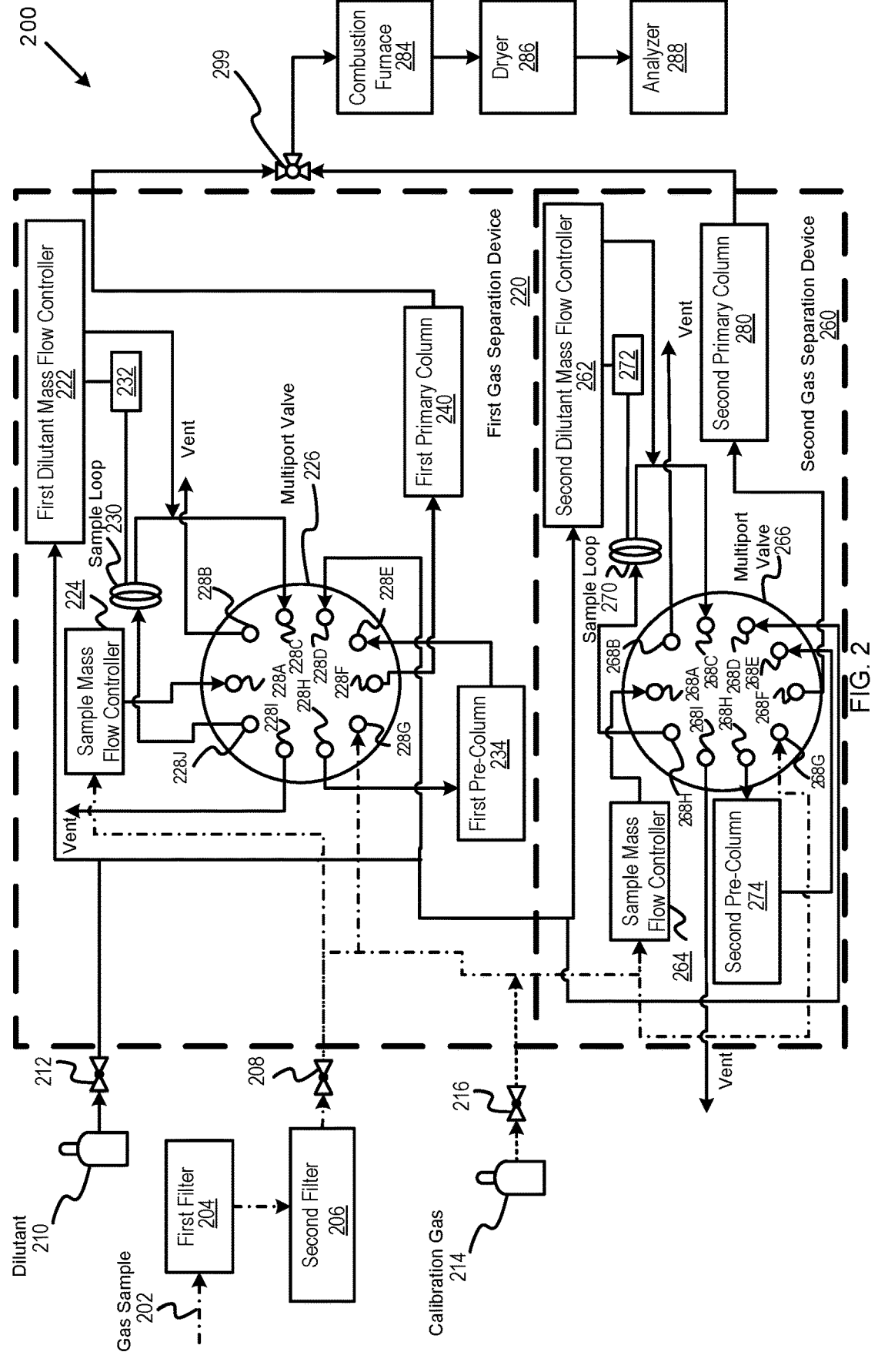
FIG. 2 depicts a second example of a gas chromatography system that provides at least one separate sample mass flow controller and at least one separate dilutant instrument for each of multiple gas separation devices, according to some embodiments.

FIG. 2 depicts a second example of a multi-column gas chromatography system 200 that provides at least one separate sample mass flow controller or fixed orifice and at least one separate dilutant instrument for each of the gas separation devices, according to some embodiments. The gas chromatography system 200 is similar in many respects to the gas chromatography system 100 of FIG. 1. Accordingly, like reference numbers have been used to reference similar, if not identical, features. Hydrocarbon and chemical species needing to be analyzed from a formation gas sample 202 may have different concentration levels and may need to be diluted individually for processing through at least a first gas separation device 220 and a second gas separation device 260.

The gas chromatography system 200 differs, for the most part, from the gas chromatography system 100, in that a gas sample 202 is received from a valve 208 into the first gas separation device 220 through a sample mass flow controller 224. The gas sample 202, in some embodiments, may be filtered through a first filter 204 and second filter 206. The gas sample 202 then passes into a multi-port valve 226 having ports 228A through 228J. The gas sample 202 may be further processed through sample loop 230, a first pre-column 234, and a first primary column 240. A sample analysis processor 232 communicatively coupled with sample loop 230 and the first dilutant mass flow controller 222 may determine a concentration level of the sample and determine that dilution is needed for the concentration to be within a first analyzable range. In response to a sample analysis processor 232 determining that dilution is needed, the first dilutant mass flow controller 222 may receive the dilutant 210 from a valve 212 and direct a first amount of dilutant to be added into the gas sample 202 between the sample loop 230 and passing back into the multi-port valve 226. If a carrier or calibration gas 114 is needed, the port 228G may receive the calibration gas 214 from a valve 216. The final processed gas sample 202 may exit through the port 228F and be directed through valve 299 for further gas chromatography processing.

In this embodiment, the second gas separation device 260 is similar to the second gas separation device 160 as described above and like reference numbers have been used to reference similar, if not identical, features. The second gas separation device 260 receives the gas sample 202 through a sample mass flow controller 264 and passes into a multi-port valve 266 having ports 268A through 268J. A sample analysis processor 272 may be communicatively coupled with various features within the second gas separation device 260 and determine a concentration level of the at least one second hydrocarbon. Upon determining that dilution is needed to adjust the concentration to within a second analyzable range, the gas sample 202 may be diluted individually by a second amount of dilutant 210 via a second dilutant mass flow controller 262. The gas sample 202 may be similarly processed though a sample loop 270, a second pre-column 274, and a second primary column 280. The gas sample may be diluted individually by the dilutant 210 via a second dilutant mass flow controller 262 communicatively coupled with the sample analysis processor 272. The dilutant 210 may be mixed with the gas sample 202 after the sample 202 has been processed through the sample loop 270 and before re-entering the multi-port valve 226 via the port 268C. The final processed gas sample 202 may exit through the port 228F and be directed through valve 299 for further gas chromatography processing.

The processed and analyzed gases from both the first gas separation device 220 and the second gas separation device 260 may be sent for further gas chromatography processing. The processed gas samples 202 may pass through a valve 299 and on to combustion furnace 284, dryer 286, and gas chromatography analyzer 288.

Figure 3:
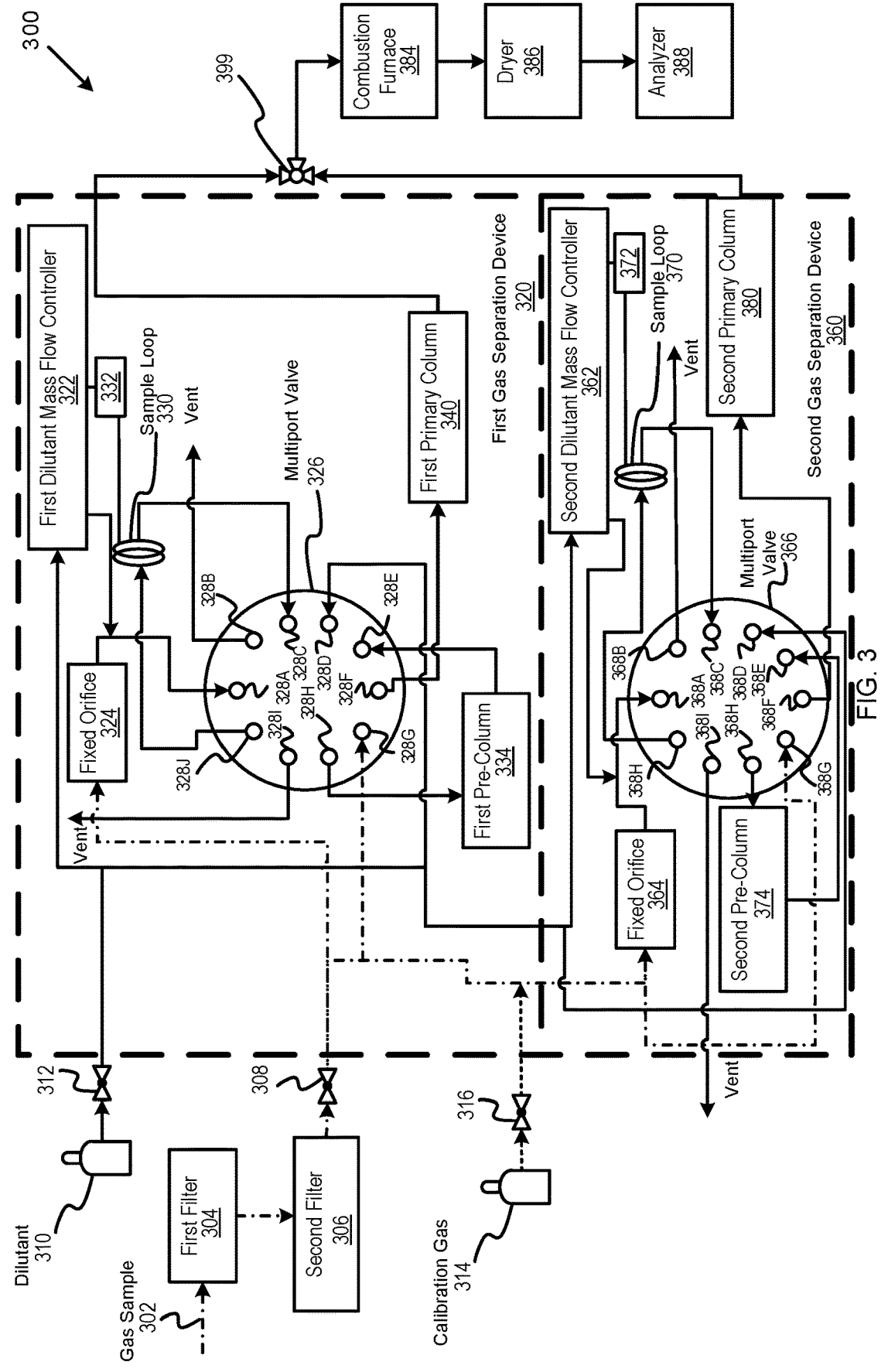
FIG. 3 depicts a third example of gas chromatography system that provides at least one separate dilutant instrument for each of multiple gas separation devices, according to some embodiments.

FIG. 3 depicts a third example of gas chromatography system 300 that provides at least one separate dilutant instrument for each of multiple gas separation devices, according to some embodiments. The gas chromatography system 300 is similar in many respects to the gas chromatography systems 100 and 200 of FIG. 1-2. Accordingly, like reference numbers have been used to reference similar, if not identical, features. Hydrocarbon and chemical species needing to be analyzed from a formation gas sample 302 may have different concentration levels and may need to be diluted individually for processing through at least a first gas separation device 320 and a second gas separation device 360.

The gas chromatography system 300 differs, for the most part, from the gas chromatography system 100, in that a dilutant 310 may be mixed with the gas sample 302 at a different location or stage of processing. The gas sample 302 is received from a valve 308 into the first gas separation device 320 through a fixed orifice 324. The gas sample 302, in some embodiments, may be filtered through a first filter 304 and second filter 306. In some examples, a sample analysis processor 332 may determine a concentration of the at least one first hydrocarbon and further determine that dilution of the gas sample 302 may be needed to increase a concentration level of the at least one hydrocarbon identified for analysis in the first gas separation device 320. A first dilutant mass flow controller 322 receives the dilutant 310 from a valve 312. A first amount of dilutant 310 may be added into the gas sample 302 after the gas sample 302 has passed through the fixed orifice 324 before the gas sample enters a multi-port valve 326. The multi-port valve 326 includes ports 328A through 328J to pass or receive the diluted gas sample 302 for further processing through a sample loop 330, a first pre-column 334, primary column 340, or to be vented as needed. If a carrier or calibration gas 114 is needed, the port 328G may receive the calibration gas 314 from a valve 316. The final processed gas sample 302 may be directed to valve 399 for further gas chromatography processing.

In this embodiment, the second gas separation device 360 is similar to the second gas separation device 160 as described above and like reference numbers have been used to reference similar, if not identical, features. The second gas separation device 360 receives the gas sample 302 through a fixed orifice 364 and into a multi-port valve 366 having ports 368A through 368J. A sample analysis processor 372 may be communicatively coupled with various features within the second gas separation device 360 and determine a concentration level of the at least one second hydrocarbon. Upon determining that dilution is needed to adjust the concentration to within a second analyzable range, the gas sample 302 may be diluted individually by a second amount of dilutant 310 via a second dilutant mass flow controller 362. The dilutant 310 may be mixed with the gas sample 302 after the sample 302 has passed through the fixed orifice 364 and before entering the multi-port valve. The diluted gas sample 302 may be similarly processed through a sample loop 370, a second pre-column 374, second primary column 380, or vented in some examples. The final processed gas sample 302 may be directed to valve 399 for further gas chromatography processing.

The processed and analyzed gases from both the first gas separation device 320 and the second gas separation device 360 may be sent for further gas chromatography processing. The processed gas samples 302 may pass through a valve 399 and on to combustion furnace 384, dryer 386, and gas chromatography analyzer 388.

Figure 4:
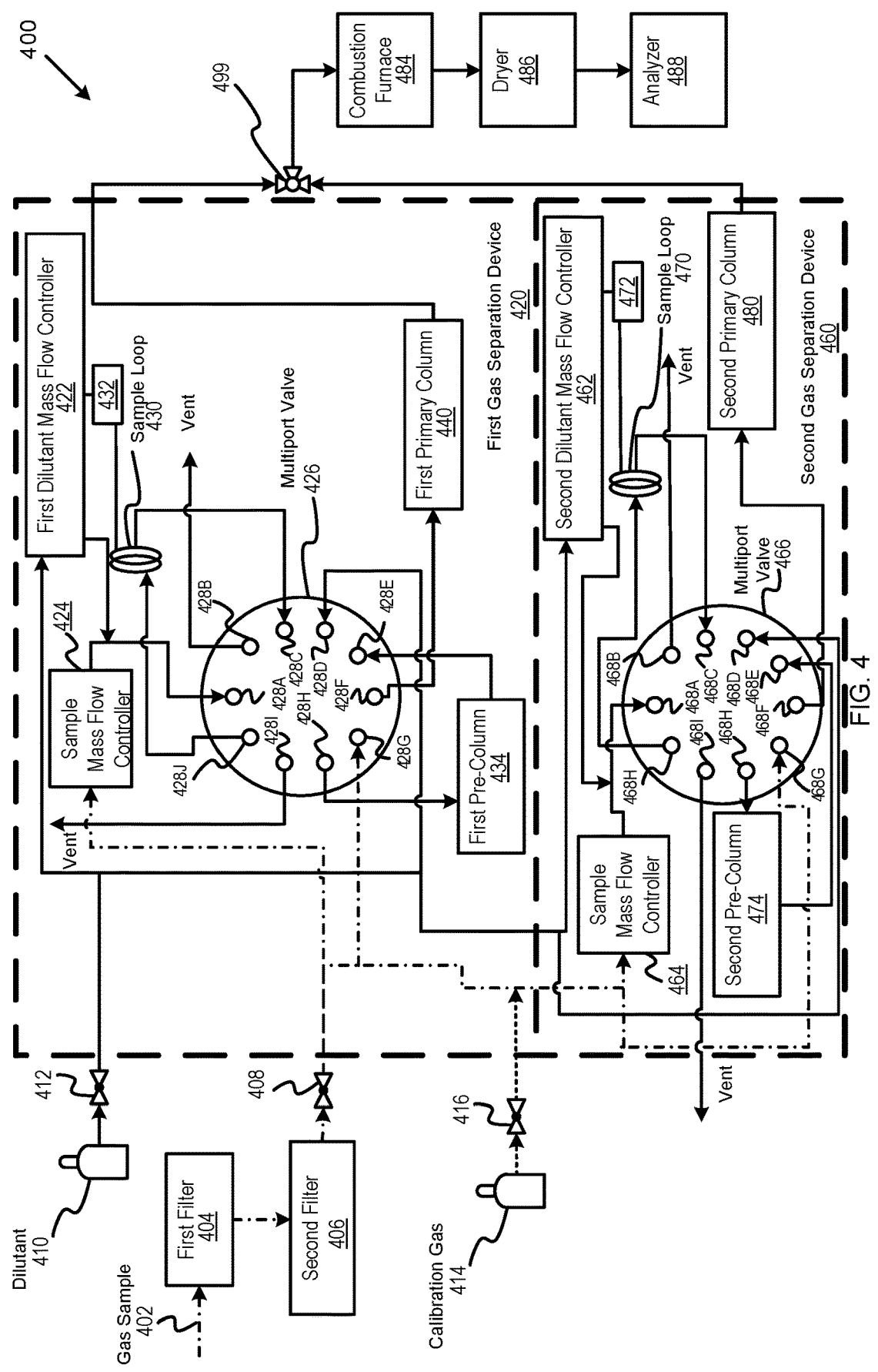
FIG. 4 depicts a fourth example of a gas chromatography system that provides at least one separate sample mass flow controller and at least one separate dilutant instrument for each of multiple gas separation devices, according to some embodiments.

FIG. 4 depicts a fourth example of gas chromatography system 400 that provides at least one sample mass flow controller and at least one separate dilutant instrument for each of multiple gas separation devices, according to some embodiments. The gas chromatography system 400 is similar in many respects to the gas chromatography systems 100-300 of FIG. 1-3. Accordingly, like reference numbers have been used to reference similar, if not identical, features. Hydrocarbon and chemical species needing to be analyzed from a formation gas sample 402 may have different concentration levels and may need to be diluted individually for processing through at least a first gas separation device 420 and a second gas separation device 460.

The gas chromatography system 400 differs, for the most part, from the gas chromatography system 100, in that a dilutant 410 may be mixed with the gas sample 402 at a different location or stage of processing. The gas sample 402 is received from a valve 408 into the first gas separation device 420 through a sample mass flow controller 424. The gas sample 402, in some embodiments, may be filtered through a first filter 404 and second filter 406. In some examples, dilution of the gas sample 402 may be needed to increase a concentration level of the at least one hydrocarbon identified for analysis in the first gas separation device 420. A first dilutant mass flow controller 422 receives the dilutant 410 from a valve 412. The dilutant 410 may be added into the gas sample 402 after the gas sample 402 has passed through the sample mass flow controller 424 before the gas sample enters a multi-port valve 426. The multi-port valve 426 includes ports 428A through 428J to pass or receive the diluted gas sample 402 for further processing through a sample loop 430, a first pre-column 434, or to be vented as needed. If a carrier or calibration gas 114 is needed, the port 428G may receive the calibration gas 414 from a valve 416. The final processed gas sample 402 may exit through the port 428F and be directed to first primary column 440 for further gas chromatography processing.

In this embodiment, the second gas separation device 460 is similar to the second gas separation device 160 as described above and like reference numbers have been used to reference similar, if not identical, features. The second gas separation device 460 receives the gas sample 402 through a sample mass flow controller 464 and passes into a multi-port valve 466 having ports 468A through 468J. A sample analysis processor 472 may be communicatively coupled with various features within the second gas separation device 460 and determine a concentration level of the at least one second hydrocarbon. Upon determining that dilution is needed to adjust the concentration to within a second analyzable range, the gas sample 402 may be diluted individually by a second amount of dilutant 410 via a second dilutant mass flow controller 462. The dilutant 410 may be mixed with the gas sample 402 after the sample 402 has passed through the sample mass flow controller 464 and before entering the multi-port valve. The diluted gas sample 402 may be similarly processed through a sample loop 470, a second pre-column 474, second primary column 480, or vented in some examples. The final processed gas sample 402 may be directed to valve 499 for further gas chromatography processing.

The processed and analyzed gases from both the first gas separation device 420 and the second gas separation device 460 may be sent for further gas chromatography processing. The processed gas samples 402 may pass through a valve 499 and on to combustion furnace 484, dryer 486, and gas chromatography analyzer 488.

Figure 5:
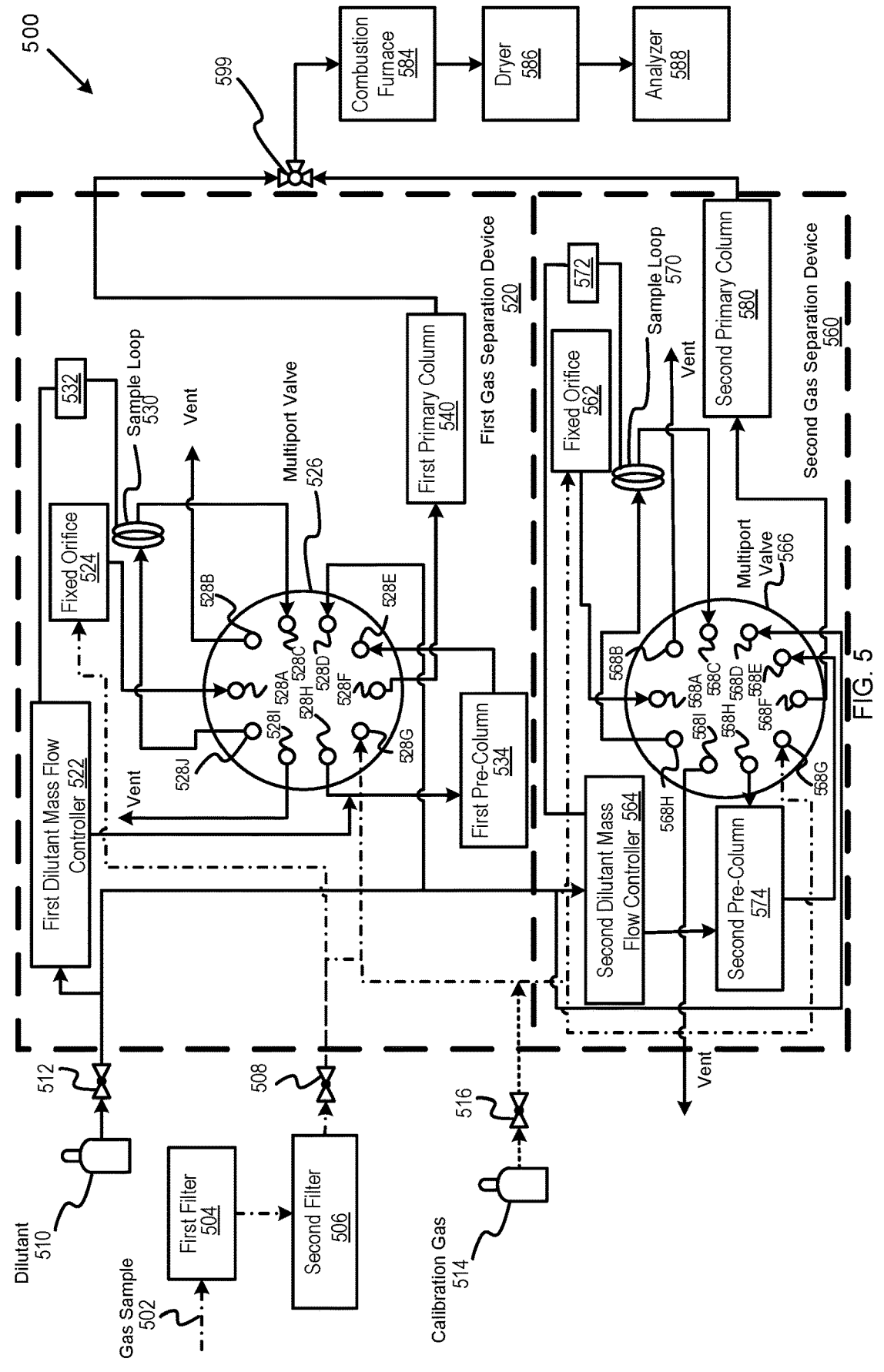
FIG. 5 depicts a fifth example of a gas chromatography system, that provides at least one separate dilutant instrument for each of multiple gas separation devices, according to some embodiments.

FIG. 5 depicts a fifth example of gas chromatography system 500 that provides at least one separate dilutant instrument for each of multiple gas separation devices, according to some embodiments. The gas chromatography system 500 is similar in many respects to the gas chromatography systems 100-400 of FIG. 1-4. Accordingly, like reference numbers have been used to reference similar, if not identical, features. Hydrocarbon and chemical species needing to be analyzed from a formation gas sample 502 may have different concentration levels and may need to be diluted individually for processing through at least a first gas separation device 520 and a second gas separation device 560.

The gas chromatography system 500 differs, for the most part, from the gas chromatography system 100, in that a dilutant 510 may be mixed with the gas sample 502 at a different location or stage of processing. The gas sample 502 is received from a valve 508 into the first gas separation device 520 through a fixed orifice 524. The gas sample 502, in some embodiments, may be filtered through a first filter 504 and second filter 506. The gas sample passes from the fixed orifice 524 into a multi-port valve 526. The multi-port valve 526 includes ports 528A through 528J to pass or receive the gas sample 502 for further processing through a sample loop 530, a first pre-column 534, or to be vented as needed.

In some examples, dilution of the gas sample 502 may be needed to increase a concentration level of the at least one hydrocarbon identified for analysis in the first gas separation device 120. A first dilutant mass flow controller 522 receives the dilutant 510 from a valve 512. The dilutant 510 may be added into the gas sample 502 after the gas sample 502 has exited the multiport valve 526 through the port 528H and before the gas sample 502 passes through the first pre-column 534. If a carrier or calibration gas 114 is needed, the port 528G may receive the calibration gas 514 from a valve 516. The final processed gas sample 502 may exit through the port 528F and be directed to first primary column 540 for further gas chromatography processing.

In this embodiment, the second gas separation device 560 is similar to the second gas separation device 160 as described above and like reference numbers have been used to reference similar, if not identical, features. The second gas separation device 560 receives the gas sample 502 through a fixed orifice 564 and passes into a multi-port valve 566 having ports 568A through 568J. A sample analysis processor 572 may be communicatively coupled with various features within the second gas separation device 560 and determine a concentration level of the at least one second hydrocarbon. Upon determining that dilution is needed to adjust the concentration to within a second analyzable range, the gas sample 502 may be diluted individually by a second amount of dilutant 510 via a second dilutant mass flow controller 562. The dilutant 510 may be mixed with the gas sample 502 before the gas sample enters the second pre-column 574. In this example, the dilutant 510 is directed directly into the second pre-column 574, but may also be mixed with the gas sample 502 just after exiting the port 568H and before entering the second pre-column 574. The diluted gas sample 502 may be similarly processed through a sample loop 570, a second pre-column 574, second primary column 580, or vented in some examples. The final processed gas sample 502 may be directed to valve 599 for further gas chromatography processing.

The processed and analyzed gases from both the first gas separation device 520 and the second gas separation device 560 may be sent for further gas chromatography processing. The processed gas samples 502 may pass through a valve 599 and on to combustion furnace 584, dryer 586, and gas chromatography analyzer 588.

Figure 6:
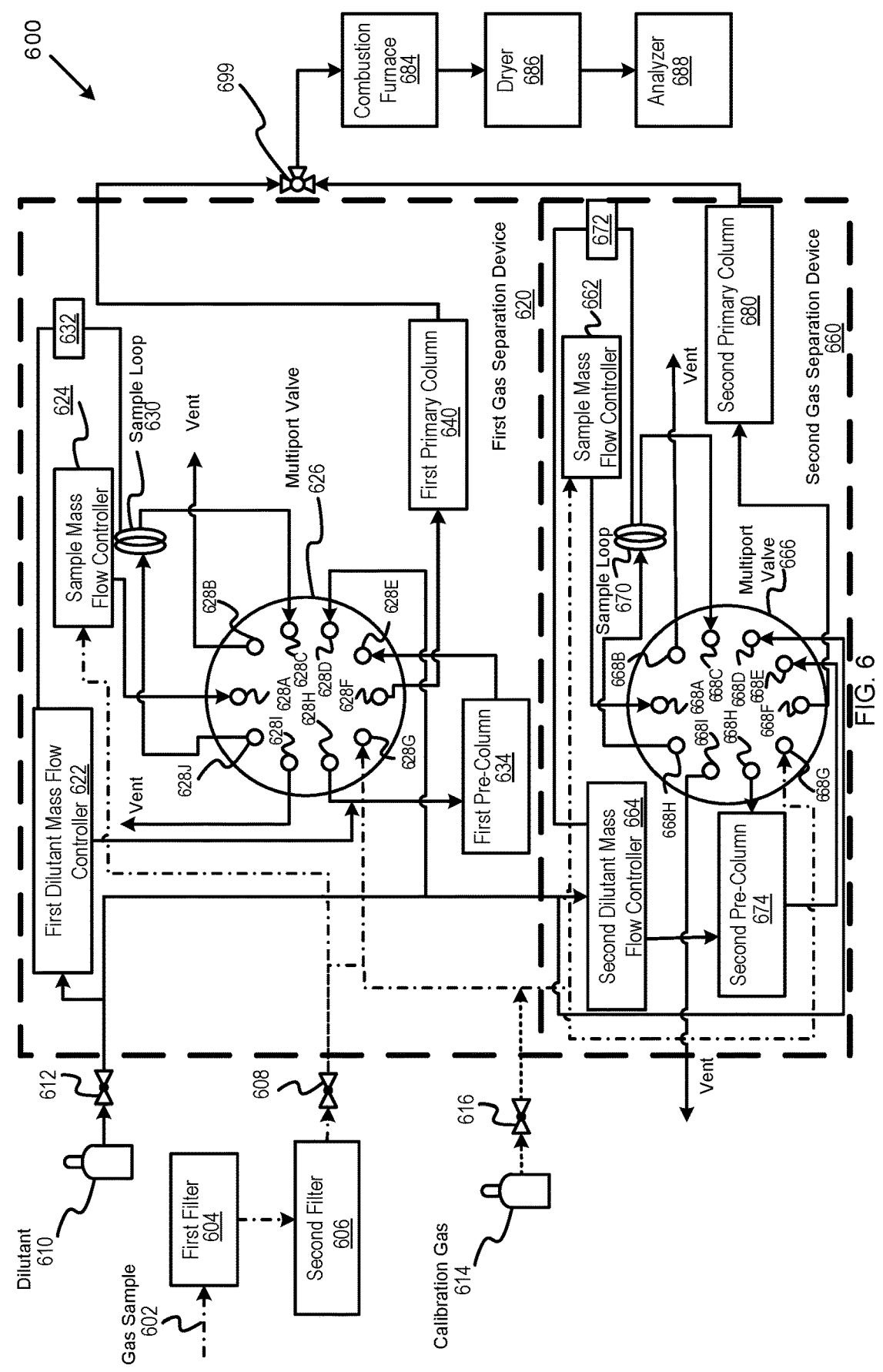
FIG. 6 depicts a sixth example of a gas chromatography system that provides that provides at least one separate sample mass flow controller and at least one separate dilutant instrument for each of multiple gas separation devices, according to some embodiments.

FIG. 6 depicts a sixth example of gas chromatography system 600 that provides at least one separate sample mass flow controller and at least one dilutant instrument for each of multiple gas separation devices, according to some embodiments. The gas chromatography system 600 is similar in many respects to the gas chromatography systems 100-500 of FIG. 1-5. Accordingly, like reference numbers have been used to reference similar, if not identical, features. Hydrocarbon and chemical species needing to be analyzed from a formation gas sample 602 may have different concentration levels and may need to be diluted individually for processing through at least a first gas separation device 620 and a second gas separation device 660.

The gas chromatography system 600 differs, for the most part, from the gas chromatography system 100, in that a dilutant 610 may be mixed with the gas sample 602 at a different location or stage of processing. The gas sample 602 is received from a valve 608 into the first gas separation device 620 through a sample mass flow controller 624. The gas sample 602, in some embodiments, may be filtered through a first filter 604 and second filter 606. The gas sample passes from the sample mass flow controller 624 into a multi-port valve 626. The multi-port valve 626 includes ports 628A through 628J to pass or receive the gas sample 602 for further processing through a sample loop 630, a first pre-column 634, or to be vented as needed.

In some examples, dilution of the gas sample 602 may be needed to increase a concentration level of the at least one hydrocarbon identified for analysis in the first gas separation device 120. A first dilutant mass flow controller 622 receives the dilutant 610 from a valve 612. The dilutant 610 may be added into the gas sample 602 after the gas sample 602 has exited the multiport valve 626 through the port 628H and before the gas sample 602 passes through the first pre-column 634. If a carrier or calibration gas 114 is needed, the port 628G may receive the calibration gas 614 from a valve 616. The final processed gas sample 602 may exit through the port 628F and be directed to first primary column 640 for further gas chromatography processing.

In this embodiment, the second gas separation device 660 is similar to the second gas separation device 160 as described above and like reference numbers have been used to reference similar, if not identical, features. The second gas separation device 660 receives the gas sample 602 through a sample mass flow controller 664 and passes into a multiport valve 666 having ports 668A through 668J. A sample analysis processor 672 may be communicatively coupled with various features within the second gas separation device 660 and determine a concentration level of the at least one second hydrocarbon. Upon determining that dilution is needed to adjust the concentration to within a second analyzable range, the gas sample 602 may be diluted individually by a second amount of dilutant 610 via a second dilutant mass flow controller 662. The dilutant 610 may be mixed with the gas sample 602 before the gas sample enters the second pre-column 674. In this example, the dilutant 610 is directed directly into the second pre-column 674, but may also be mixed with the gas sample 602 just after exiting the port 668H and before entering the second pre-column 674. The diluted gas sample 602 may be similarly processed through a sample loop 670, a second pre-column 674, second primary column 680, or vented in some examples. The final processed gas sample 602 may be directed to valve 699 for further gas chromatography processing.

The processed and analyzed gases from both the first gas separation device 620 and the second gas separation device 660 may be sent for further gas chromatography processing.

The processed gas samples 602 may pass through a valve 699 and on to combustion furnace 684, dryer 686, and gas chromatography analyzer 688.

Figure 7:
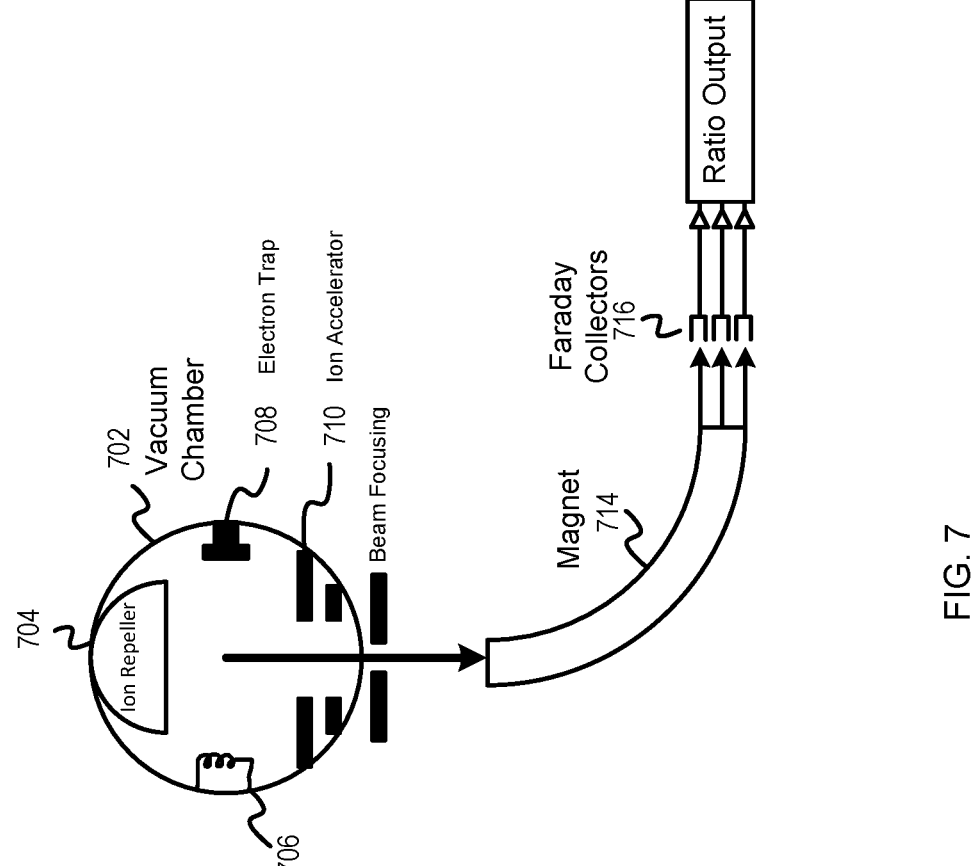
FIG. 7 depicts one example of a mass spectrometer that may be used with examples of the gas chromatography systems disclosed herein, according to some embodiments.
Figure 7:
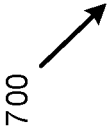

FIG. 7 depicts one example of a mass spectrometer 700 that may be used with examples of the gas chromatography systems disclosed herein, according to some embodiments. The mass spectrometer 700 may be used in addition to, with, or in place of the analyzer 188 in FIG. 1, for example. The mass spectrometer 700 may be an isotopic ratio mass spectrometer (IRMS). After the analyzed samples complete the process through any of the gas chromatography systems 100-600 as described above, the processed sample(s) may proceed to the mass spectrometer 700 for further processing. In this example, the sample enters an ionization vacuum chamber 702 including an ion repeller 704, a coil 706, and electron trap 708 and an ion accelerator 710. The sample is focused through a bean focuser as it leaves the vacuum chamber and passes through a magnet 712 for deflection of a magnetic field therein. The sample then passes through Faraday collectors 714 and a ratio output is ultimately produced. Those skilled in the art will understand this is a very basic example of a mass spectrometer and various other examples and components may be used to process the gas sample.

Example Operations

Figure 8:
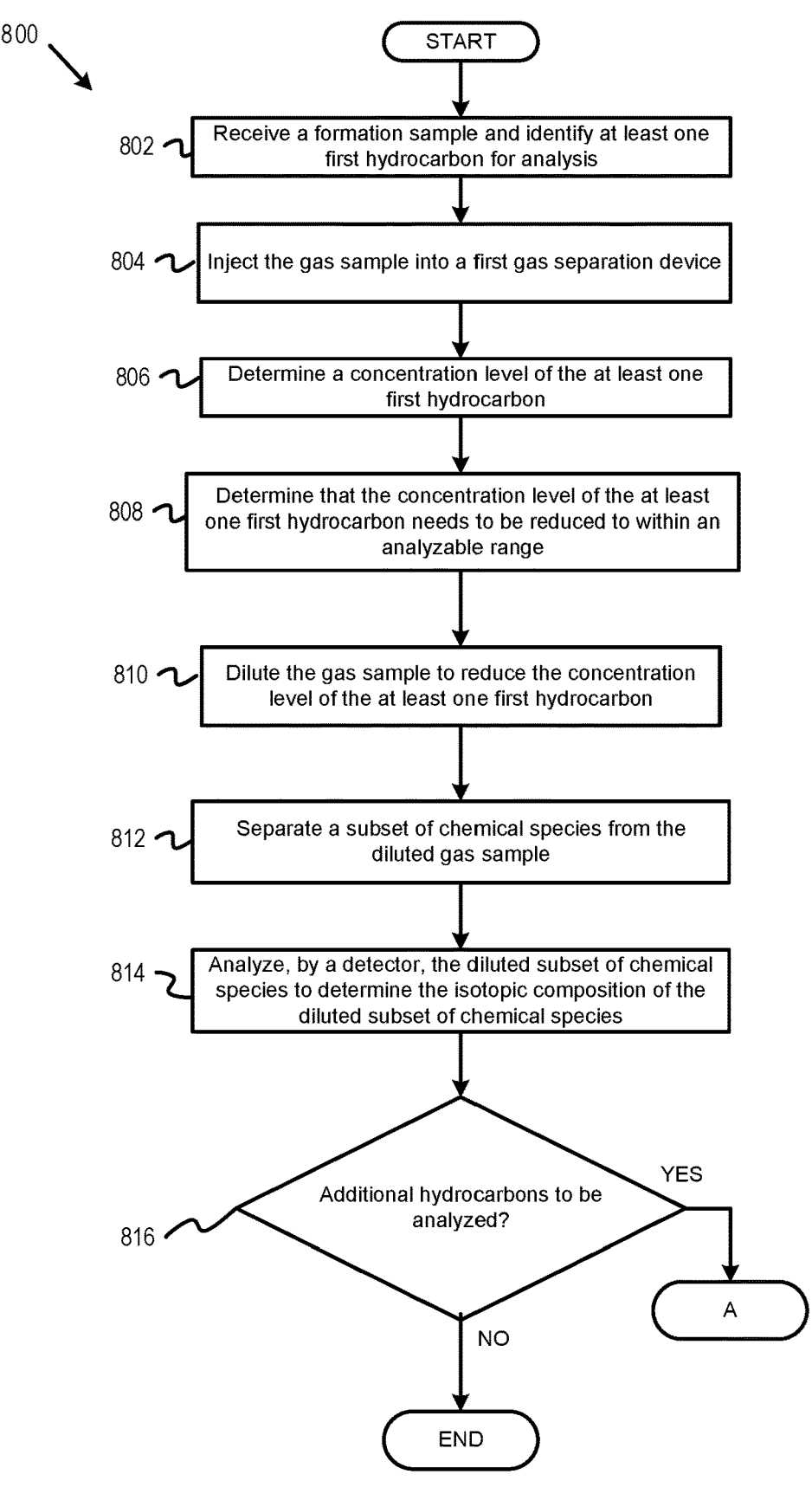
FIGS. 8-9 depict flowcharts of example operations for gas separation and gas chromatography, according to some embodiments.
Figure 9:
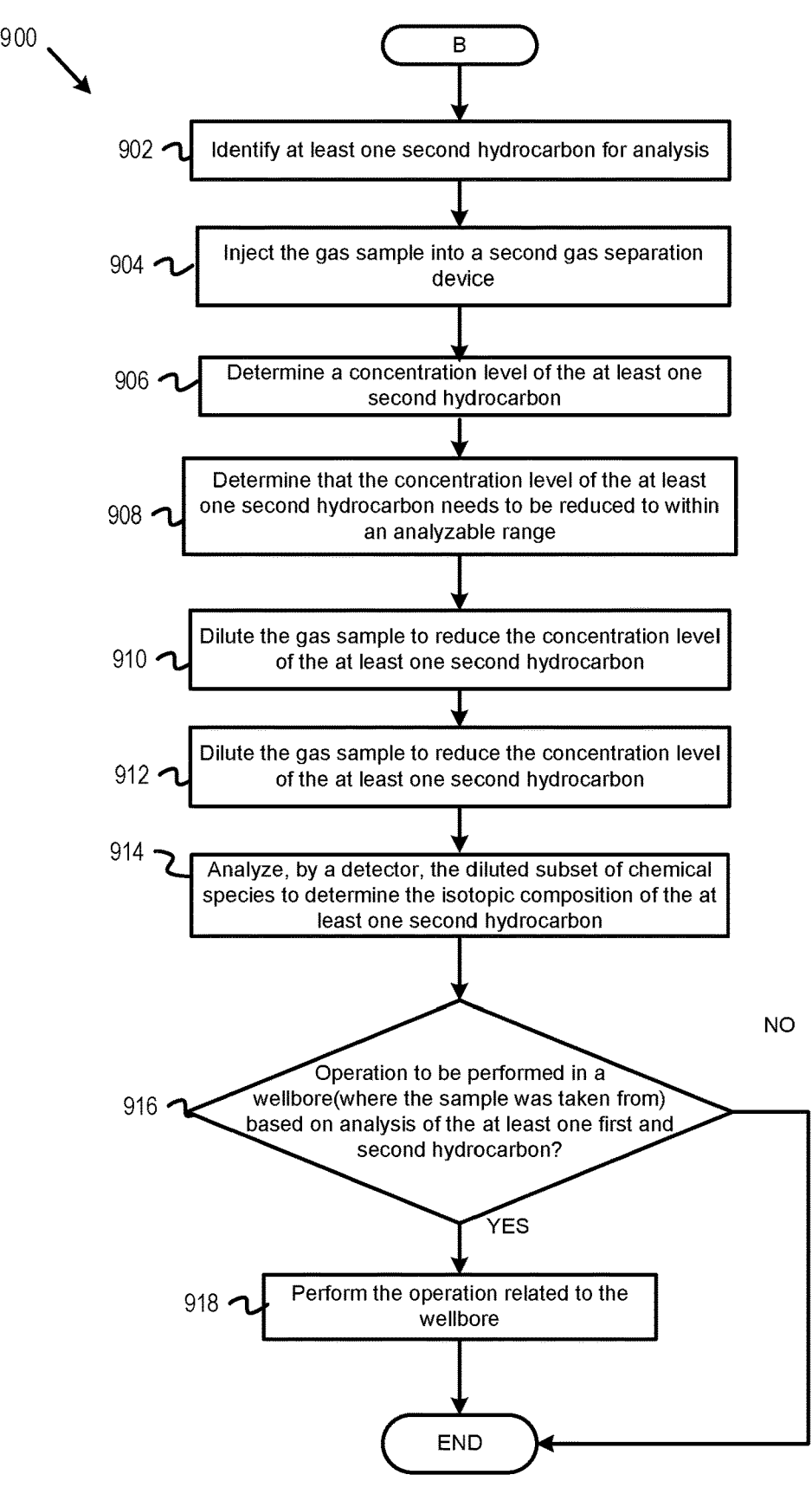

FIG. 8-9 depict flowcharts of example operations for a gas chromatography system, according to some embodiments. Operations of flowcharts 800-900 of FIG. 8-9 continue between each other through transition points A and B. Some operations of the flowcharts 800-800 can be performed by software, firmware, hardware, or a combination thereof. Operations of the flowcharts 800-800 are described in reference to the examples of a gas chromatography systems of FIGS. 1-6. However, other systems and components can be used to perform the operations now described. The operations of the flowchart 800 start at block 802.

At block 802, a gas sample, such as sample 102, is received having a number of chemical compounds comprising a number of hydrocarbons. In some implementations, the gas sample may be received from a subsurface formation into which a wellbore is formed. In one example, the gas sample may be received from a drilling system in a subsurface formation includes a drilling system, such as depicted below in reference to FIG. 10.

At a block 804 the gas sample having a number of chemical compounds comprising a number of hydrocarbons that includes the at least one first hydrocarbon identified for analysis is injected into the first gas separation device.

At a block 806, a first sample analysis processor determines a concentration level of the at least one first hydrocarbon. The first sample analysis processor may include a non-destructive detector and be communicatively coupled with a sample loop sampling the gas sample. In other embodiments, the first sample analysis processor may determine the concentration level based on previous results.

At a block 808, the first sample analysis processor determines that the concentration level of the at least one first hydrocarbon needs to be reduced to within a first analyzable range for an analyzer for the at least one first hydrocarbon. The first sample analysis processor is communicatively coupled with a first dilutant mass flow controller and at a block 810, the first dilutant mass flow controller dilutes, with a first amount of a dilutant, the gas sample to form a first diluted gas sample such that the concentration level of the at least one first hydrocarbon is reduced to within the analyzable range.

At a block 812, a subset of chemical species that includes the at least one first hydrocarbon is separated out from the first diluted gas sample by the first gas separation device.

At a block 814, the subset of chemical species subset of chemical species that includes the at least one first hydrocarbon is separated out from the first diluted gas sample is sent to the analyzer and analyzed to determine the isotopic composition thereof.

At a block 816, a determination is made whether more hydrocarbons need to be analyzed from the gas sample. If Yes, then operations of the flowchart 800 may continue at transition point A, which continue at transition point B of the flowchart 900 (which is further described below). If No, then the operations of the flowchart end.

Operations of the flowchart 900 are now described. From transition point B, operations continue at block 902.

At the block 904, the gas sample that includes at least one second hydrocarbon identified for analysis is injected into a second gas separation device.

At a block 906, a second sample analysis processor determines a concentration level of the at least one second hydrocarbon. The second sample analysis processor may be configured similarly to the first sample analysis processor.

At a block 908, the sample analysis processor determines that the concentration level of the at least one second hydrocarbon needs to be reduced to within a second analyzable range for the analyzer for the at least one second hydrocarbon.

At a block 910, a second dilutant mass flow controller dilutes, with a second amount of the dilutant that is different from the first amount of the dilutant, the gas sample to form a second diluted gas sample such that the concentration level of the at least one second hydrocarbon is reduced to within the second analyzable range.

At a block 912, a subset of chemical species that includes the at least one second hydrocarbon separated out from the second diluted gas sample by the second gas separation device.

At a block 914, the analyzer analyzes the subset of the chemical species to measure an isotopic composition of the at least one second hydrocarbon.

At block 916, a determination is made whether any operations or adjustments to any operations within the wellbore are needed. If any adjustments or operations are needed, the wellbore operation is performed in a block 918. If no wellbore operations are needed, the method ends at a block 920 and the method is complete for at least two hydrocarbons identified for analysis from the gas sample.

Example System

An example system during drilling in which example embodiments include multi-column gas chromatography for analysis of a formation sample is now described. While described in reference to a drilling operation, example embodiments may be used in various wellbore applications and at various stages of drilling and/or production of hydrocarbons from the subsurface formations in which the wellbore is formed.

Figure 10:
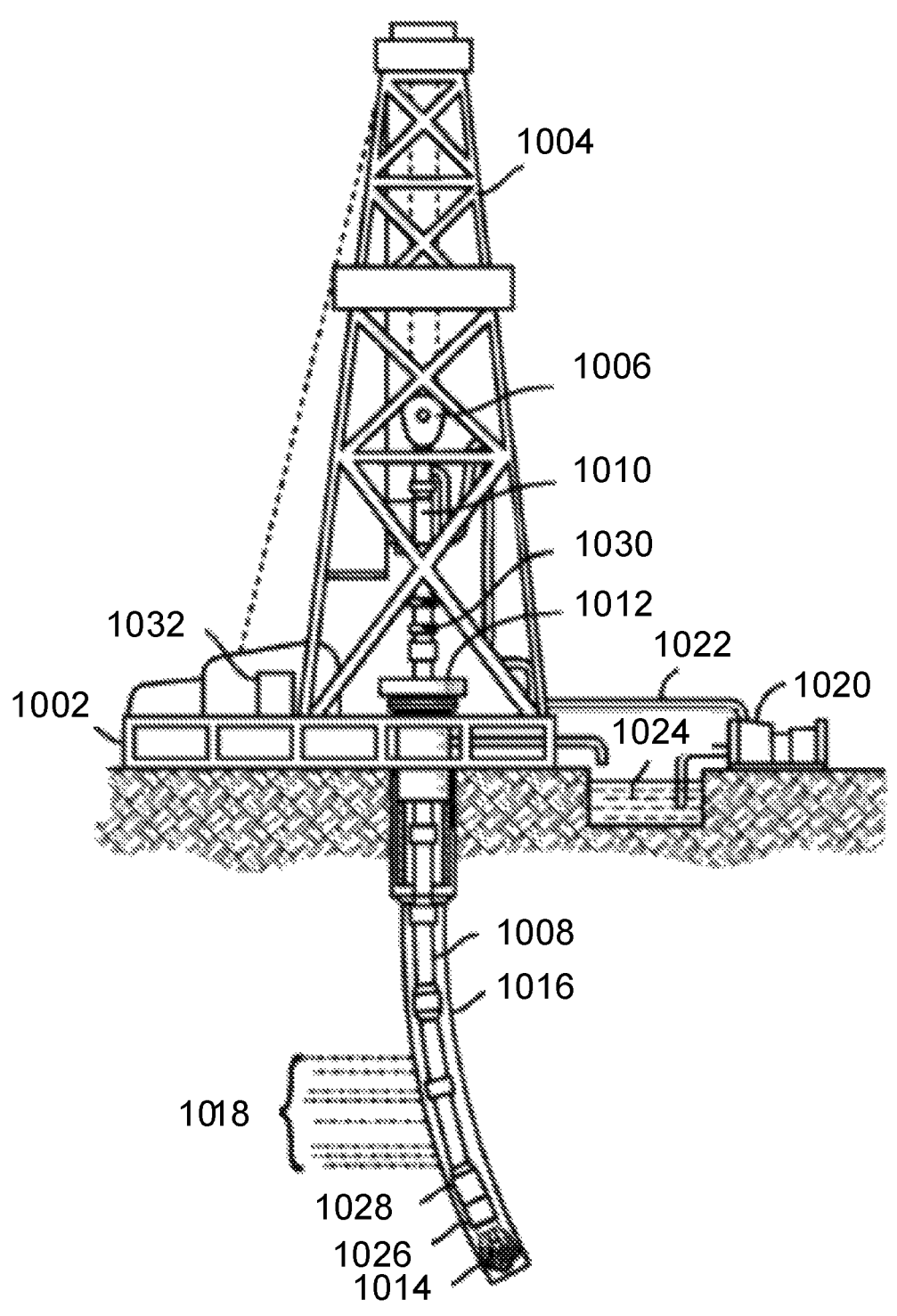
FIG. 10 depicts an example system for drilling a wellbore, according to some embodiments.

FIG. 10 depicts an example system for drilling a wellbore, according to some embodiments. A drilling platform 1002 supports a derrick 1004 having a traveling block 1006 for raising and lowering a drill string 1008 into a wellbore. A top drive 1010 supports and rotates the drill string 1008 as the string is lowered through a well head 1012. The drill string's rotation (and/or a downhole motor) drives a drill bit 1014 to extend the borehole through subsurface formations 1021. Mud recirculation equipment 1016 draws drilling fluid from a retention pit 1024 and pumps it through a feed pipe 1018 to top drive 1010, through the interior of drill string 1008 to the drill bit 1014, through orifices in drill bit, through the annulus around drill string 1008 to a blowout preventer at the surface, and through a discharge pipe into the pit 1024. The drilling fluid transports cuttings from the borehole into the pit 1024 and aids in maintaining the borehole integrity.

During drilling, formation samples from the subsurface formations 1021 may flow into the annulus around the drill string 1008 and flow to the surface of the wellbore. Such formation samples may be processed to analyze such samples using any one of the example multi-column gas chromatography instruments and control devices (described herein). In some implementations, the formation samples may be captured downhole using formation fluid sampling tools. These captured formation samples may be processed downhole and/or transported for processing at the surface.

For example, one or more logging tools 1026 may be integrated into a bottomhole assembly 1080 near the bit 1014. Suitable logging tools include formation fluid sampling tools, acoustic logging tools, electromagnetic resistivity tools, and nuclear magnetic resonance tools, among others. Logging while drilling tools usually take the form of a drill collar, i.e., a thick-walled tubular that provides weight and rigidity to aid the drilling process. As the bit extends the borehole through the formations, the logging tool(s) collect measurements of formation characteristics. Other tools and sensors can also be included in the bottomhole assembly 1080 to gather measurements of various drilling parameters such as position, orientation, weight-on-bit, borehole diameter, etc. Control/telemetry module 1028 collects data from the various bottomhole assembly instruments (including position and orientation information) and stores them in internal memory. Selected portions of the data can be communicated to surface receivers 1030 by, e.g., mud pulse telemetry. Other logging-while drilling telemetry methods also exist and could be employed. For example, electromagnetic telemetry or through-wall acoustic telemetry can be employed with an optional repeater 1032 to extend the telemetry range. As another example, the drill string 1008 could be formed from wired drillpipe that enables waveforms or images to be transmitted to the surface in real time to enable quality control and processing to optimize the logging resolution. Most telemetry systems also enable commands to be communicated from the surface to the control and telemetry module to configure the operation of the tools.

Example Computer

Figure 11:
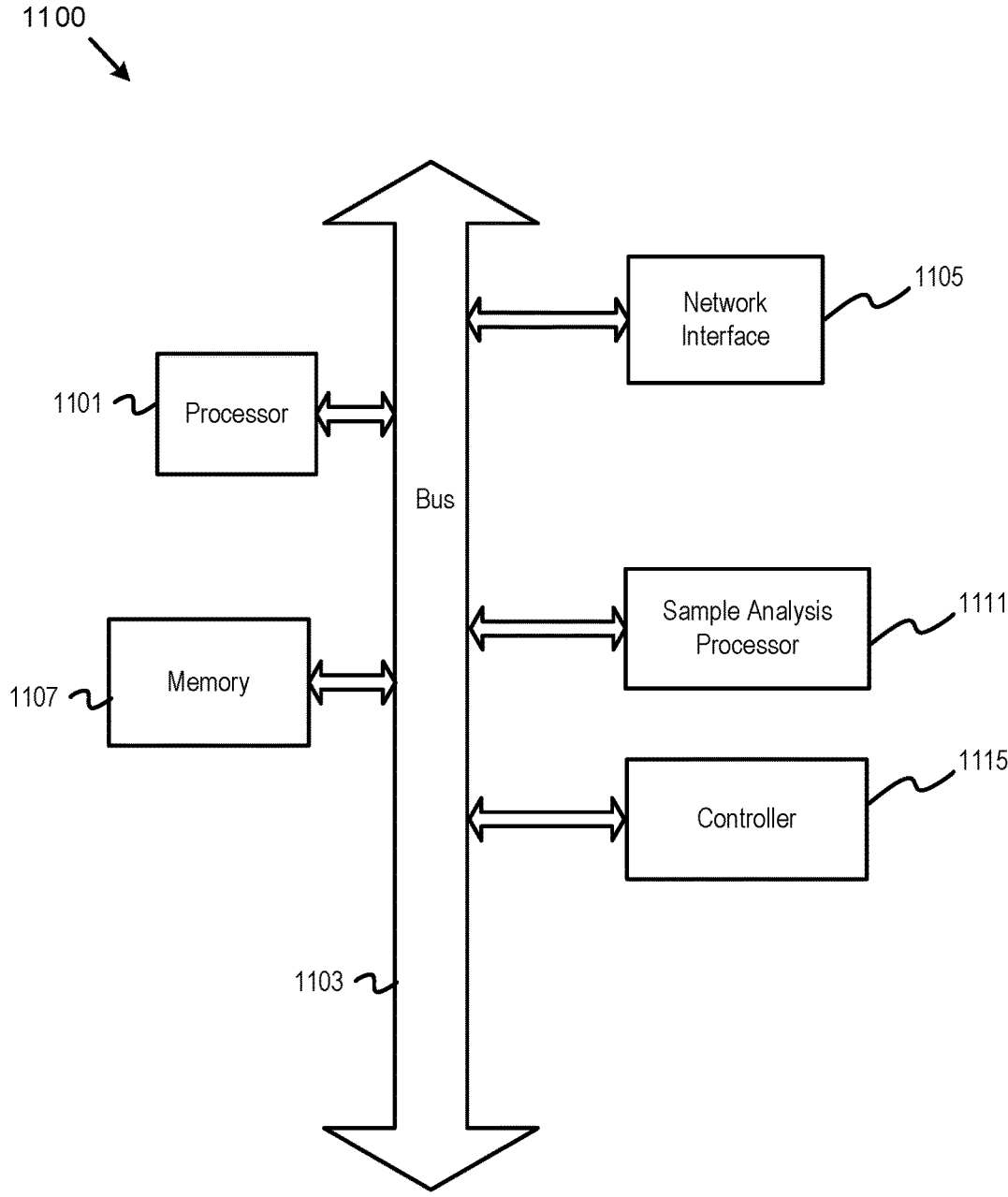
FIG. 11 depicts an example computer, according to some embodiments.

FIG. 11 depicts an example computer 1100, according to some embodiments. The computer 1100 includes a processor 1101 (possibly including multiple processors, multiple cores, multiple nodes, and/or implementing multi-threading, etc.). The computer 1100 includes a memory 1108. The memory 1108 may be system memory or any one or more of the above already described possible realizations of machine-readable media. The computer 1100 also includes a bus 1103 and a network interface 1105.

The computer 1100 also includes a sample analysis processor 1111 and a controller 1115. The sample analysis processor 1111 and the controller 1115 can perform one or more of the operations described herein and may be coupled with one or more components of the gas chromatography systems 100-600 described herein, such as the sample loops, dilutant mass flow controllers, pre-columns, and primary columns. For example, the sample analysis processor 1111 can process information related to the concentration levels of the gas sample and determinations of whether or not, and how much, dilution is needed for the identified hydrocarbon being processed in at least the first gas separation device and the second gas separation device. The controller 1115 can perform various control operations of the gas chromatography system based on the identified hydrocarbons and concentration levels. The controller 1115 may be communicatively coupled with or included as part of the sample analysis processor 1111 and the dilutant mass flow controller. The controller 1115 may control various operations within each gas separation device and the chromatography system. For example, the controller 1115 may control the flow through the various valves, dilutant mass flow controllers, and various other components within the gas chromatography system.

Any one of the previously described functionalities may be partially (or entirely) implemented in hardware and/or on the processor 1101. For example, the functionality may be implemented with an application specific integrated circuit, in logic implemented in the processor 1101, in a co-processor on a peripheral device or card, etc. Further, realizations may include fewer or additional components not illustrated in FIG. 11 (e.g., video cards, audio cards, additional network interfaces, peripheral devices, etc.). The processor 1101 and the network interface 1105 are coupled to the bus 1103. Although illustrated as being coupled to the bus 1103, the memory 1108 may be coupled to the processor 1101.

While the aspects of the disclosure are described with reference to various implementations and exploitations, it will be understood that these aspects are illustrative and that the scope of the claims is not limited to them. In general, techniques for simulating drill bit abrasive wear and damage during the drilling of a wellbore as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine-readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

Example Embodiments

Aspects disclosed herein include:

Aspect A: A method comprising: injecting, into a first gas separation device, a gas sample having a number of chemical compounds comprising a number of hydrocarbons that includes at least one first hydrocarbon identified for analysis; determining a concentration level of the at least one first hydrocarbon; determining that the concentration level of the at least one first hydrocarbon needs to be reduced to within a first analyzable range for an analyzer for the at least one first hydrocarbon; diluting, with a first amount of a dilutant, the gas sample to form a first diluted gas sample such that the concentration level of the at least one first hydrocarbon is reduced to within the analyzable range; separating out, from the first diluted gas sample by the first gas separation device, a subset of chemical species that includes the at least one first hydrocarbon; injecting, into a second gas separation device, the gas sample that includes at least one second hydrocarbon identified for analysis; determining a concentration level of the at least one second hydrocarbon; determining that the concentration level of the at least one second hydrocarbon needs to be reduced to within a second analyzable range for the analyzer for the at least one second hydrocarbon; diluting, with a second amount of the dilutant that is different from the first amount of the dilutant, the gas sample to form a second diluted gas sample such that the concentration level of the at least one second hydrocarbon is reduced to within the second analyzable range; separating out, from the second diluted gas sample by the second gas separation device, a subset of chemical species that includes the at least one second hydrocarbon; analyzing, by the analyzer, the subset of the chemical species to measure an isotopic composition of the at least one first hydrocarbon; and analyzing, by the analyzer, the subset of the chemical species to measure an isotopic composition of the at least one second hydrocarbon.

Aspect B: An apparatus, comprising: a first gas separation device, the first gas separation device comprising: a first intake device for receiving a gas sample from a formation, wherein the gas sample includes at least one first hydrocarbon identified for analysis; a first analysis processor configured to determine whether a concentration level of the at least one first hydrocarbon needs to be reduced to within a first analyzable range for the at least one first hydrocarbon, a first dilutant mass flow controller communicatively coupled with the first analysis processor, the first dilutant mass flow controller configured to, in response to a determination that the concentration level of the at least one first hydrocarbon needs to be reduced to within the first analyzable range, dilute, using a first amount of a dilutant, the gas sample to form a first diluted gas sample such that the concentration level of the at least one first hydrocarbon is reduced to within the first analyzable range; and a first column for separating out, from the diluted gas sample, a subset of chemical species that includes the at least one first hydrocarbon; a second gas separation device, the second gas separation device comprising: a second intake device for receiving a gas sample from a formation, wherein the gas sample includes at least one second hydrocarbon identified for analysis; a second analysis processor configured to determine whether a concentration level of the at least one second hydrocarbon needs to be reduced to within a second analyzable range for the at least one second hydrocarbon, a second dilutant mass flow controller communicatively coupled with the second analysis processor, the second dilutant mass flow controller configured to, in response to a determination that the concentration level of the at least one second hydrocarbon needs to be reduced to within the second analyzable range, dilute, using a second amount of a dilutant, the same sample to form a second diluted gas sample such that the concentration level of the at least one second hydrocarbon is reduced to within the second analyzable range; and a second column for separating out, from the second diluted gas sample, a subset of chemical species that includes the at least one second hydrocarbon; and an analyzer configured to, analyze the subset of the chemical species that includes the at least one first hydrocarbon to measure an isotopic composition of the at least one first hydrocarbon; and analyze the subset of the chemical species that includes the at least one second hydrocarbon to measure an isotopic composition of the at least one second hydrocarbon.

Aspect C: A system, the system comprising: a gas sample valve for directing a gas sample from a formation into a gas chromatography system for analysis, wherein the gas sample includes at least one first hydrocarbon and at least one second hydrocarbon identified for analysis; a dilutant valve for directing a dilutant into the gas chromatography system; wherein the gas chromatography system includes: a first gas separation device, the first gas separation device comprising: a first intake device for receiving the gas sample from the gas sample valve, wherein the gas sample includes the at least one first hydrocarbon identified for analysis; a first analysis processor configured to determine whether a concentration level of the at least one first hydrocarbon needs to be reduced to within a first analyzable range for the at least one first hydrocarbon, a first dilutant mass flow controller communicatively coupled with the first analysis processor, the first dilutant mass flow controller configured to, in response to a determination that the concentration level of the at least one first hydrocarbon needs to be reduced to within the first analyzable range, dilute, using a first amount of a dilutant, the gas sample to form a first diluted gas sample such that the concentration level of the at least one first hydrocarbon is reduced to within the first analyzable range; and a first column for separating out, from the diluted gas sample, a subset of chemical species that includes the at least one first hydrocarbon; a second gas separation device, the second gas separation device comprising: a second intake device for receiving the gas sample from the gas sample valve, wherein the gas sample includes the at least one second hydrocarbon identified for analysis; a second analysis processor configured to determine whether a concentration level of the at least one second hydrocarbon needs to be reduced to within a second analyzable range for the at least one second hydrocarbon, a second dilutant mass flow controller communicatively coupled with the second analysis processor, the second dilutant mass flow controller configured to, in response to a determination that the concentration level of the at least one second hydrocarbon needs to be reduced to within the second analyzable range, dilute, using a second amount of a dilutant, the same sample to form a second diluted gas sample such that the concentration level of the at least one second hydrocarbon is reduced to within the second analyzable range; and a second column for separating out, from the second diluted gas sample, a subset of chemical species that includes the at least one second hydrocarbon; and an analyzer configured to, analyze the subset of the chemical species that includes the at least one first hydrocarbon to measure an isotopic composition of the at least one first hydrocarbon; and analyze the subset of the chemical species that includes the at least one second hydrocarbon to measure an isotopic composition of the at least one second hydrocarbon.

Aspects A, B, and C may have one or more of the following additional elements in combination:

Element 1: wherein the first gas separation device includes a first dilutant mass flow controller and the second gas separation device includes a second dilutant mass flow controller.

Element 2: further comprising processing the gas sample through a first sample loop of the first gas separation device.

Element 3: wherein diluting the gas sample occurs before the processing of the gas sample through the first sample loop.

Element 4: wherein diluting the gas sample occurs after the processing of the gas sample through the first sample loop.

Element 5: wherein the dilutant comprises an inert gas.

Element 6: wherein the inert gas is one of the noble gases and nitrogen.

Element 7: further comprising performing a downhole operation in a wellbore based on the isotopic composition of the at least one first hydrocarbon.

Element 8: wherein at least one of the first intake device and the second intake device is a fixed orifice.

Element 9: wherein at least one of the first intake device and the second intake device is a sample mass flow controller.

Element 10: wherein the first gas separation device further comprises a multi-port valve for directing flow of the gas sample within the first gas separation device, and wherein the second gas separation device further comprises a multi-port valve for directing flow of the gas sample within the second gas separation device.

Element 11: wherein the first analysis processor comprises a non-destructive detector for determining the concentration level of the gas sample.

Element 12: wherein the non-destructive detector is one of an isotope ratio (IR) detector, a tunable diode laser (TDL) analyzer.

Element 13: further comprising: processing the gas sample through a combustion furnace and a dryer.

Element 14: the system further comprising a combustion furnace and a dryer.

Element 15: wherein the analyzer is an isotopic ratio mass spectrometer.

The invention claimed is:

1. A method comprising:

injecting, into a first gas separation device, a gas sample having a number of chemical compounds comprising a number of hydrocarbons that includes at least one first hydrocarbon identified for analysis;

determining a concentration level of the at least one first hydrocarbon;

determining that the concentration level of the at least one first hydrocarbon needs to be reduced to within a first analyzable range for an analyzer for the at least one first hydrocarbon;

diluting, with a first amount of a dilutant, the gas sample to form a first diluted gas sample such that the concentration level of the at least one first hydrocarbon is reduced to within the first analyzable range;

separating out, from the first diluted gas sample by the first gas separation device, a subset of chemical species that includes the at least one first hydrocarbon;

injecting, into a second gas separation device, the gas sample that includes at least one second hydrocarbon identified for analysis;

determining a concentration level of the at least one second hydrocarbon;

determining that the concentration level of the at least one second hydrocarbon needs to be reduced to within a second analyzable range for the analyzer for the at least one second hydrocarbon;

diluting, with a second amount of the dilutant that is different from the first amount of the dilutant, the gas sample to form a second diluted gas sample such that the concentration level of the at least one second hydrocarbon is reduced to within the second analyzable range;

separating out, from the second diluted gas sample by the second gas separation device, a subset of chemical species that includes the at least one second hydrocarbon;

analyzing, by the analyzer, the subset of the chemical species to measure an isotopic composition of the at least one first hydrocarbon; and analyzing, by the analyzer, the subset of the chemical species to measure an isotopic composition of the at least one second hydrocarbon.

2. The method of claim 1, wherein the first gas separation device includes a first dilutant mass flow controller and the second gas separation device includes a second dilutant mass flow controller.

3. The method of claim 1, further comprising processing the gas sample through a first sample loop of the first gas separation device.

4. The method of claim 3, wherein diluting the gas sample occurs before the processing of the gas sample through the first sample loop.

5. The method of claim 3, wherein diluting the gas sample occurs after the processing of the gas sample through the first sample loop.

6. The method of claim 1, wherein the dilutant comprises an inert gas.

7. The method of claim 6, wherein the inert gas is one of the noble gases and nitrogen.

8. The method of claim 1, further comprising performing a downhole operation in a wellbore based on the isotopic composition of the at least one first hydrocarbon.

9. An apparatus, comprising:

a first gas separation device, the first gas separation device comprising:

a first intake device for receiving a gas sample from a formation, wherein the gas sample includes at least one first hydrocarbon identified for analysis;

a first analysis processor configured to determine whether a concentration level of the at least one first hydrocarbon needs to be reduced to within a first analyzable range for the at least one first hydrocarbon, a first dilutant mass flow controller communicatively coupled with the first analysis processor, the first dilutant mass flow controller configured to, in response to a determination that the concentration level of the at least one first hydrocarbon needs to be reduced to within the first analyzable range, dilute, using a first amount of a dilutant, the gas sample to form a first diluted gas sample such that the concentration level of the at least one first hydrocarbon is reduced to within the first analyzable range; and a first column for separating out, from the first diluted gas sample, a subset of chemical species that includes the at least one first hydrocarbon;

a second gas separation device, the second gas separation device comprising:

a second intake device for receiving the gas sample from the formation, wherein the gas sample includes at least one second hydrocarbon identified for analysis;

a second analysis processor configured to determine whether a concentration level of the at least one second hydrocarbon needs to be reduced to within a second analyzable range for the at least one second hydrocarbon, a second dilutant mass flow controller communicatively coupled with the second analysis processor, the second dilutant mass flow controller configured to, in response to the determination that the concentration level of the at least one second hydrocarbon needs to be reduced to within the second analyzable range, dilute, using a second amount of a dilutant, the same sample to form a second diluted gas sample such that the concentration level of the at least one second hydrocarbon is reduced to within the second analyzable range; and a second column for separating out, from the second diluted gas sample, a subset of chemical species that includes the at least one second hydrocarbon; and an analyzer configured to, analyze the subset of the chemical species that includes the at least one first hydrocarbon to measure an isotopic composition of the at least one first hydrocarbon; and analyze the subset of the chemical species that includes the at least one second hydrocarbon to measure an isotopic composition of the at least one second hydrocarbon.

10. The apparatus according to claim 9, wherein at least one of the first intake device and the second intake device is a fixed orifice.

11. The apparatus according to claim 9, wherein at least one of the first intake device and the second intake device is a sample mass flow controller.

12. The apparatus according to claim 9, wherein the first gas separation device further comprises a multi-port valve for directing flow of the gas sample within the first gas separation device, and wherein the second gas separation device further comprises a multi-port valve for directing flow of the gas sample within the second gas separation device.

13. The apparatus according to claim 9, wherein the first analysis processor comprises a non-destructive detector for determining the concentration level of the gas sample.

14. The apparatus according to claim 13, wherein the non-destructive detector is one of an isotope ratio (IR) detector, a tunable diode laser (TDL) analyzer.

15. A system, the system comprising:

a gas sample valve for directing a gas sample from a formation into a gas chromatography system for analysis, wherein the gas sample includes at least one first hydrocarbon and at least one second hydrocarbon identified for analysis;

a dilutant valve for directing a dilutant into the gas chromatography system;

wherein the gas chromatography system includes:

a first gas separation device, the first gas separation device comprising:

a first intake device for receiving the gas sample from the gas sample valve, wherein the gas sample includes the at least one first hydrocarbon identified for analysis;

a first analysis processor configured to determine whether a concentration level of the at least one first hydrocarbon needs to be reduced to within a first analyzable range for the at least one first hydrocarbon, a first dilutant mass flow controller communicatively coupled with the first analysis processor, the first dilutant mass flow controller configured to, in response to a determination that the concentration level of the at least one first hydrocarbon needs to be reduced to within the first analyzable range, dilute, using a first amount of a dilutant, the gas sample to form a first diluted gas sample such that the concentration level of the at least one first hydrocarbon is reduced to within the first analyzable range; and a first column for separating out, from the first diluted gas sample, a subset of chemical species that includes the at least one first hydrocarbon;

22 a second gas separation device, the second gas separation device comprising:

a second intake device for receiving the gas sample from the gas sample valve, wherein the gas sample includes the at least one second hydrocarbon identified for analysis;

a second analysis processor configured to determine whether a concentration level of the at least one second hydrocarbon needs to be reduced to within a second analyzable range for the at least one second hydrocarbon, a second dilutant mass flow controller communicatively coupled with the second analysis processor, the second dilutant mass flow controller configured to, in response to the determination that the concentration level of the at least one second hydrocarbon needs to be reduced to within the second analyzable range, dilute, using a second amount of a dilutant, the same sample to form a second diluted gas sample such that the concentration level of the at least one second hydrocarbon is reduced to within the second analyzable range; and a second column for separating out, from the second diluted gas sample, a subset of chemical species that includes the at least one second hydrocarbon; and an analyzer configured to, analyze the subset of the chemical species that includes the at least one first hydrocarbon to measure an isotopic composition of the at least one first hydrocarbon; and analyze the subset of the chemical species that includes the at least one second hydrocarbon to measure an isotopic composition of the at least one second hydrocarbon.

16. The system according to claim 15, further comprising:

a combustion furnace; and a dryer.

17. The system according to claim 16, wherein the analyzer is an isotopic ratio mass spectrometer.

18. The system according to claim 16, wherein the first analysis processor comprises a non-destructive detector for determining the concentration level of the gas sample.

19. The system according to claim 16, wherein at least one of the first intake device and the second intake device is a fixed orifice.

20. The system according to claim 16, wherein at least one of the first intake device and the second intake device is a sample mass flow controller.

* * * * *